US011044250B2

(12) United States Patent
Bermudez et al.

(10) Patent No.: US 11,044,250 B2
(45) Date of Patent: *Jun. 22, 2021

(54) BIOMETRIC ONE TOUCH SYSTEM

(71) Applicant: Capital One Services, LLC, McLean, VA (US)

(72) Inventors: Sophie Bermudez, Washington, DC (US); Salik Shah, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,156

(22) Filed: Aug. 23, 2019

(65) Prior Publication Data

US 2020/0045043 A1    Feb. 6, 2020

Related U.S. Application Data

(63) Continuation of application No. 16/049,896, filed on Jul. 31, 2018, now Pat. No. 10,440,020.

(51) Int. Cl.
| | |
|---|---|
| *H04L 29/06* | (2006.01) |
| *G06Q 40/02* | (2012.01) |
| *G06F 9/54* | (2006.01) |
| *G06F 16/9535* | (2019.01) |

(52) U.S. Cl.
CPC .......... *H04L 63/0861* (2013.01); *G06F 9/547* (2013.01); *G06F 16/9535* (2019.01); *G06Q 40/025* (2013.01); *H04L 63/083* (2013.01); *H04L 63/0807* (2013.01)

(58) Field of Classification Search
CPC . H04L 63/0861; H04L 63/0807; G06F 21/32; G06K 9/00597; G06K 9/00302
See application file for complete search history.

(56) References Cited

U.S. PATENT DOCUMENTS

| | | |
|---|---|---|
| 6,219,439 B1 | 4/2001 | Burger |
| 6,256,737 B1 | 7/2001 | Bianco et al. |
| 6,871,287 B1 | 3/2005 | Ellingson |
| 7,308,581 B1 * | 12/2007 | Geosimonian .......... G06F 21/32 713/182 |
| 7,334,130 B2 | 2/2008 | Bowers |
| 7,346,779 B2 | 3/2008 | Leeper |

(Continued)

*Primary Examiner* — Hosuk Song
(74) *Attorney, Agent, or Firm* — DLA Piper LLP (US)

(57) ABSTRACT

Embodiments disclosed herein generally related to a system and method of authenticating a user with a third party server. In one embodiment, a method is disclosed herein. A computing system receives, from a remote client device of the user, a token. The token includes personal identification information and a digitized file of a biometric captured by a biometric scanner. The computing system identifies via the personal identification information that the user has a user account. The computing system queries a database with the personal identification information and the digitized file to determine whether the biometric matches a stored biometric in the user account. Upon determining that the biometric matches the stored biometric, the computing system generates a message to be transmitted to the third party server that authenticates the user. The computing system transmits the message to the third party server.

20 Claims, 5 Drawing Sheets

(56) References Cited

U.S. PATENT DOCUMENTS

| | | | |
|---|---|---|---|
| 7,412,604 B1 | 8/2008 | Doyle | |
| 7,502,761 B2 * | 3/2009 | Siegal | G06F 21/32 |
| | | | 705/67 |
| 7,779,457 B2 * | 8/2010 | Taylor | G06Q 20/40 |
| | | | 726/7 |
| 7,970,678 B2 * | 6/2011 | Lapsley | G06Q 20/04 |
| | | | 705/35 |
| 8,200,980 B1 | 6/2012 | Robinson et al. | |
| 8,539,249 B2 * | 9/2013 | Wei | H04L 9/3231 |
| | | | 713/186 |
| 10,440,020 B1 * | 10/2019 | Bermudez | G06Q 40/025 |
| 2003/0105966 A1 | 6/2003 | Pu et al. | |
| 2003/0135740 A1 | 7/2003 | Talmor et al. | |
| 2009/0235086 A1 | 9/2009 | Lai et al. | |

\* cited by examiner

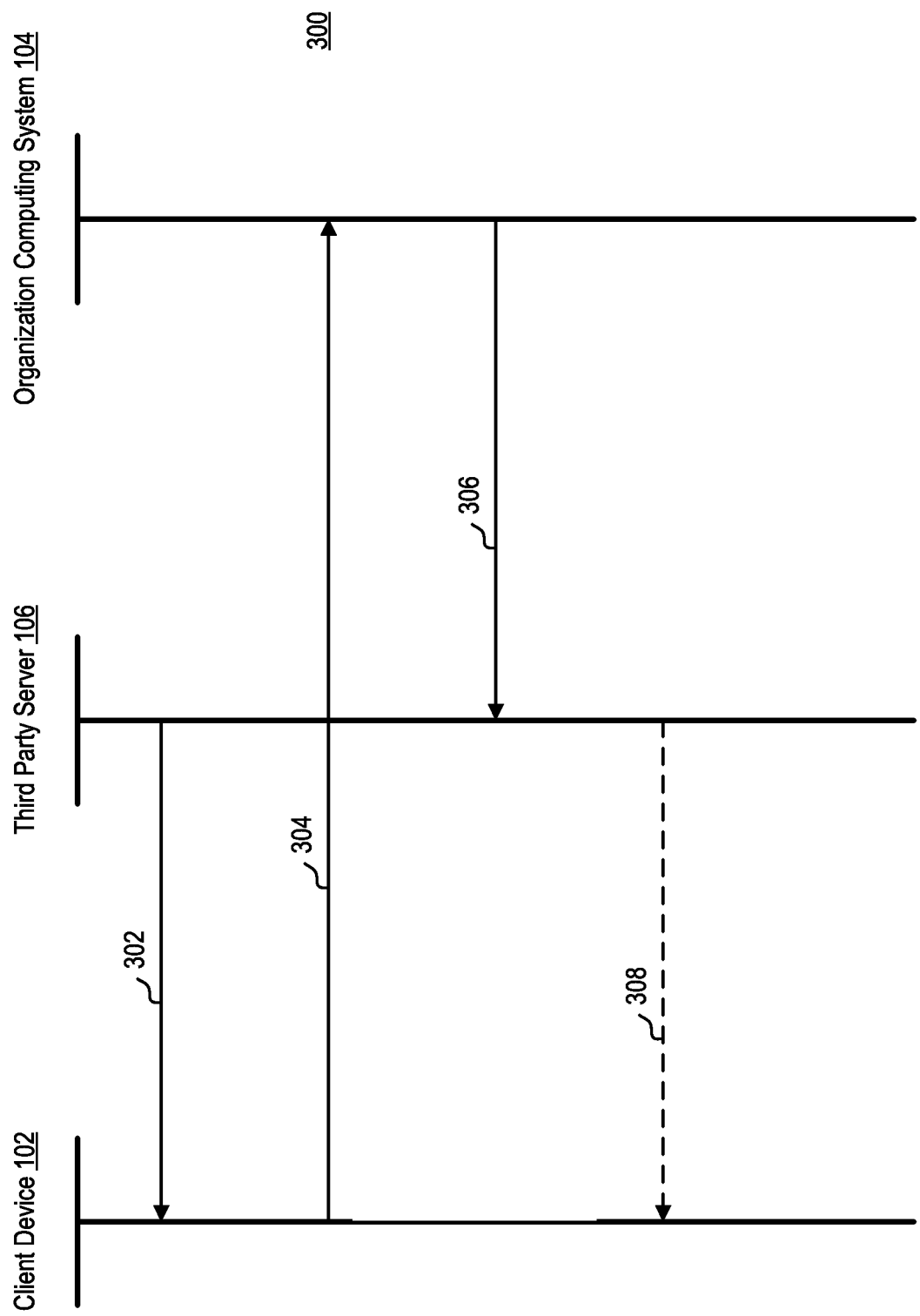

BIOMETRIC ONE TOUCH SYSTEM

CROSS-REFERENCE TO RELATED APPLICATION

This is a continuation of U.S. application Ser. No. 16/049,896, filed Jul. 31, 2018, the content of which is hereby incorporated by reference in its entirety.

FIELD OF THE DISCLOSURE

The present disclosure generally relates to a method and a system for authenticating a user with a third party server.

BACKGROUND

Mobile computing devices provide many conveniences to a user. For example, a user may operate a properly configured mobile computing device to conduct or engage in certain mobile or online banking activities that otherwise traditionally required the user to be physically present at a banking location. But while users may now remotely perform some banking activities using a mobile-device, some transactions or other activities continue to require in-person authentication. These limitations on remote and mobile banking are due at least in part to concerns surrounding the security of the transactions and the ability to verify the identity or authenticity of the user.

SUMMARY

Embodiments disclosed herein generally related to a system and method of authenticating a user with a third party server. In one embodiment, a method is disclosed herein. A computing system receives, from a remote client device of the user, a token. The token includes personal identification information and a digitized file of a biometric captured by a biometric scanner. The computing system identifies via the personal identification information that the user has a user account. The computing system queries a database with the personal identification information and the digitized file to determine whether the biometric matches a stored biometric in the user account. Upon determining that the biometric matches the stored biometric, the computing system generates a message to be transmitted to the third party server that authenticates the user. The computing system transmits the message to the third party server.

In some embodiments, the biometric may be a fingerprint scan, an iris scan, a retinal scan, a voice recording, a facial scan, a hand geometry, or a vein scan.

In some embodiments, generating the message to be transmitted to the third party server that authenticates the user includes the computing system pulling, from the database, stored personal identification information. The computing system includes the stored personal identification information from the user in the confirmation message.

In some embodiments, the stored personal identification information includes one or more of an address, a social security number, a telephone number, an electronic mail address, and a date of birth.

In some embodiments, the personal identification information comprises a username and a password.

In some embodiments, the biometric scanner is an input/output device of the remote client device.

In some embodiments, the computing system further authenticates the token transmitted by the remote client device.

In another embodiment, a method of authenticating a user with a third party server is disclosed herein. A computing system receives, at a server of an organization computing system, a request from a remote client device of the user to authenticate the user with the third party server. The computing system generates an application programming interface (API) configured to receive one or more parameters from the remote client device. The computing system notifies the remote client device that the API is available. The computing system receives, via the API, a token. The token includes personal identification information and a digitized file of a biometric captured by a biometric scanner. The computing system identifies via the personal identification information that the user has a user account. The computing system queries a database with the personal identification information and the digitized file to determine whether the biometric matches a stored biometric in the user account. Upon determining that the biometric matches the stored biometric, the computing system generates a message to be transmitted to the third party server that authenticates the user. The computing system transmits the message to the third party server.

In some embodiments, the API links the remote client device to functionality of the server of the organization computing system.

In some embodiments, the biometric may be a fingerprint scan, an iris scan, a retinal scan, a voice recording, a facial scan, a hand geometry, or a vein scan.

In some embodiments, generating the message to be transmitted to the third party server that authenticates the user includes the computing system pulling, from the database, stored personal identification information. The computing system includes the stored personal identification information from the user in the confirmation message.

In some embodiments, the stored personal identification information includes one or more of an address, a social security number, a telephone number, an electronic mail address, and a date of birth.

In some embodiments, the personal identification information includes a username and a password.

In some embodiments, the biometric scanner is an input/output device of the remote client device.

In some embodiments, the computing system authenticates the token transmitted by the remote client device.

In another embodiment, a method is disclosed herein. A computing system transmits a request to a third party server to fill out an application with a third party merchant associated with the third party server. The computing system receives, from the third party server, an authentication prompt. The computing system submits a further request to authenticate through an organizational computing system distinct from the third party server. The computing system receives a notification that an application programming interface is available for communication with the organizational computing system. The computing system transmits a pre-generated token that includes personal identification information and a digitized file of a biometric to the organizational computing system. Upon the organizational computing system verifying the personal identification information and the digitized file and communicating a verification to the third party server, the computing system receives, from the third party server, an authentication confirmation.

In some embodiments, generating the pre-generated token is generated based on a reading of the biometric using a biometric scanner.

In some embodiments, the personal identification information includes a username and password associated with a user account with the organizational computing system.

In some embodiments, the request to the third party server is a request to apply for a credit card with the third party merchant.

In some embodiments, the request to the third party server is a request to apply for a loan with the third party merchant.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 3 is a block diagram illustrating communication among one or more components of the computing environment of FIG. 1, according to one exemplary embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein generally relate to a method and a system for authenticating a user with a third party server. Conventionally, when a user interacts with a third party server to, for example, make a purchase, apply for a line of credit, sign up for a prescription drug, the user is typically prompted with a set of questions to authenticate the user's identity. Such a process may be tedious for the user by repeatedly entering personal identification information for every interaction. Further, the process of entering personal identification information into a web browser may expose the user to identity theft.

The one or more techniques disclosed herein addresses the limitations of conventional techniques by offloading the authentication process from the duty of the user to the duty of a trusted organization, such as the user's financial institution. The user's financial institution may leverage biometric information associated with the user to authenticate the user with the third party server. For example, the user may transmit a biometric reading to financial institution, which may confirm the biometric reading, and, in turn, validate a token to be transmitted to the third party server that authenticates the identity of the user. As such, at no point is the user's personal identification information exposed to fraudsters.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
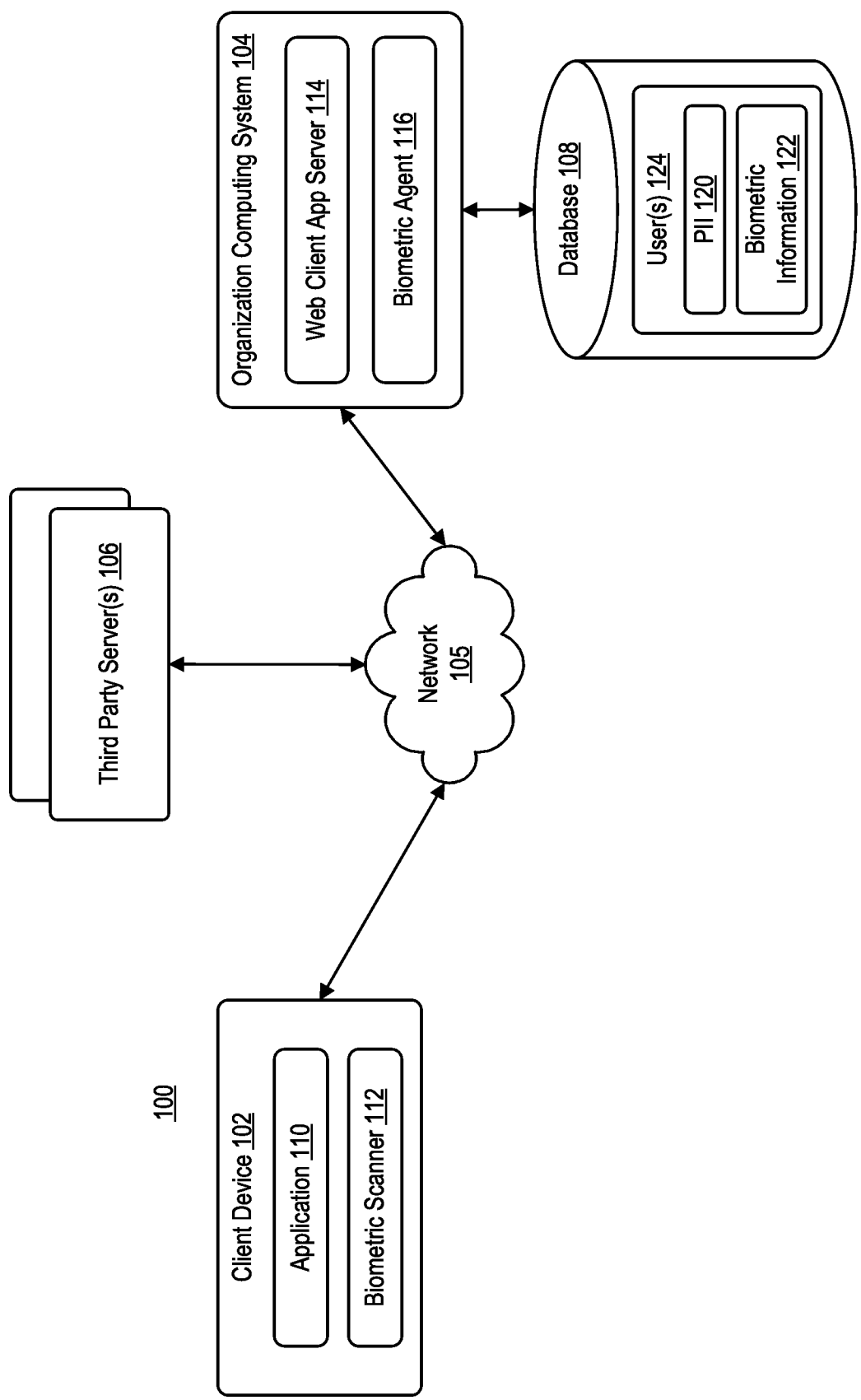
FIG. 1 is a block diagram illustrating a computing environment, according to one exemplary embodiment.

FIG. 1 is a block diagram illustrating a computing environment 100, according to one embodiment. Computing environment 100 may include at least a client device 102, one or more third party servers 106, and an organization computing system 104 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receiving information between the components of system 100.

Client device 102 may be operated by a user (or customer). For example, client device 102 may be a mobile device, a tablet, a desktop computer, or any computing system having the capabilities described herein. Client device 102 may belong to or be provided by a customer, or may be borrowed, rented, or shared. Customers may include individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 102 may include at least application 110 and biometric scanner 112. Application 110 may be representative of a web browser that allows access to a website or a stand-alone application. Client device 102 may access application 110 to access functionality of organization computing system 104. Client device 102 may communicate over network 105 to request a webpage, for example, from web client application server 114 of organization computing system 104. For example, client device 102 may be configured to execute application 110 to access content managed by web client application server 114. The content that is displayed to client device 102 may be transmitted from web client application server 114 to client device 102, and subsequently processed by application 110 for display through a graphical user interface (GUI) of client device 102.

Biometric scanner 112 is representative of a device that is configured to receive, as input, a biometric identifier. Such biometric identifiers may include, for example, a fingerprint, palm veins, facial recognition, hand geometry, iris recognition, retina recognition, voice recognition, and the like.

Client device 102 may communicate with one or more third party servers 106 over network 105. Third party servers 106 may comprise one or more computing systems associated with a third party vendor (e.g., third party merchant). In operation, user may transact with a third party server 106 of a third party vendor via client device 102. For example, via client device 102, user may interact with third party server 106 to request a credit line via a credit card application hosted on third party server 106.

Organization computing system 104 may include at least biometric agent 116. Biometric agent 116 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Biometric agent 116 may be configured to act as an intermediary between client device 102 and third party servers 106. Biometric agent 116 may be configured to verify an identity of an individual through a biometric reading received from client device 102. For example, in operation, upon receiving a new line of credit request, third party server 106 may request a biometric reading from user to verify user's identity. User may capture a biometric reading using biometric scanner 112 of client device 102. Client device 102 may transmit the biometric reading, as a token, to organization computing system 104. Biometric agent 116 may determine whether the biometric reading matches information on file for the user. Upon determining that there is a match, organization computing system 104 may transmit user-sensitive information to third party server 106 for the application process.

Organization computing system 104 may communicate with database 108. As illustrated, database 108 may include one or more user accounts 124. Each user account 124 may correspond to a respective user of an organization associated with organization computing device 104. Each account 124 may include personal identification information (PII) 120 and associated biometric information 122. Personal identification information 120 may include information associated with a particular user, such as, for example, name, address, account numbers, date of birth, social security number, phone number, user name, password, and the like. Biometric information 122 may include stored biometric readings previously received (or uploaded) by the user. Biometric information 122 may be used by biometric agent 116 to verify tokens transmitted by client device 102 during verification attempts.

Figure 2A:
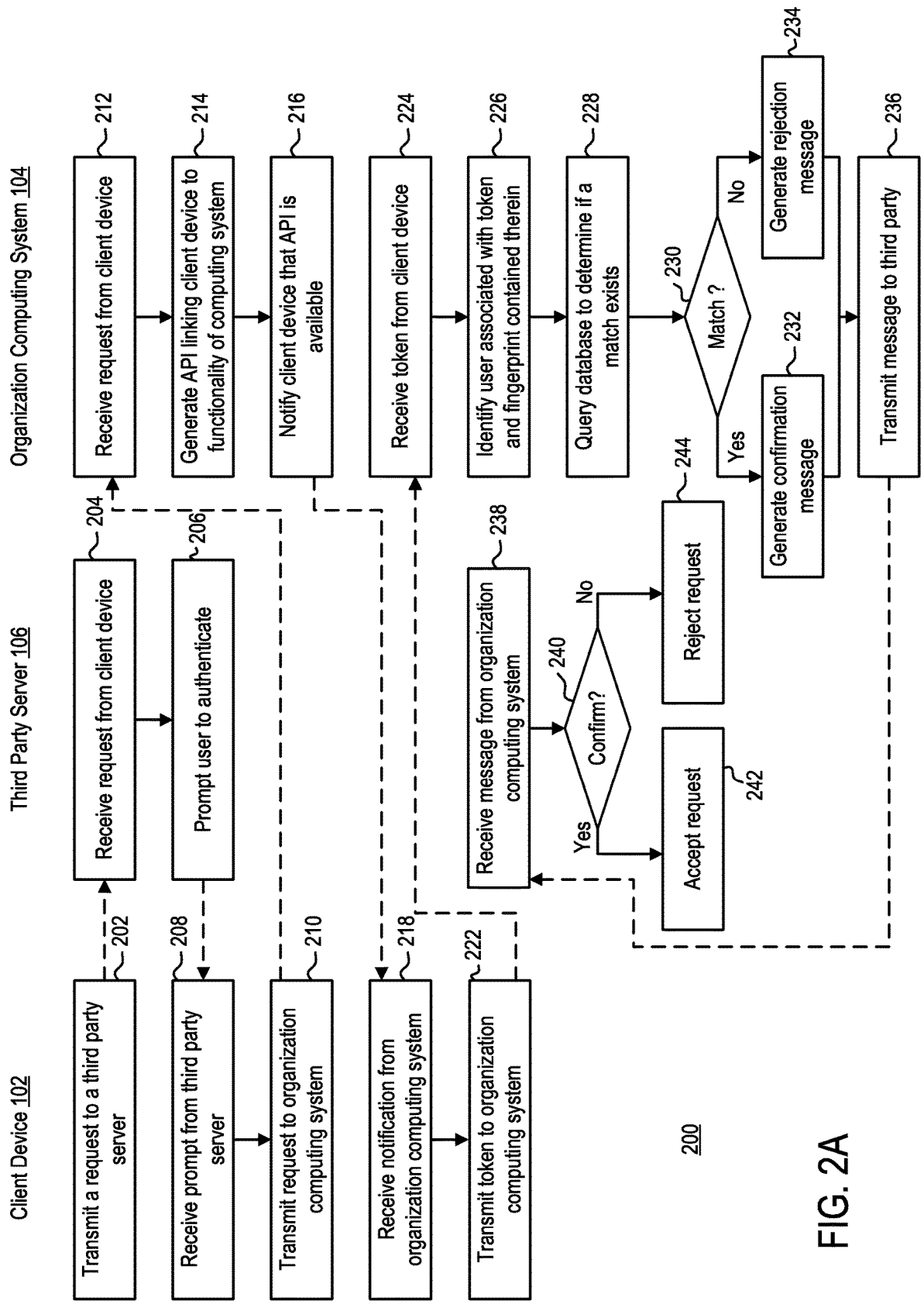
FIG. 2A is a flow diagram illustrating a method of authenticating a user with a third party server, according to one exemplary embodiment.

FIG. 2A is a flow chart illustrating a method 200 of authenticating a user with a third party server, according to one exemplary embodiment. Method 200 may begin at step 202. At step 202, client device 102 may transmit a request to third party server 106. The request may be, for example, a line of credit request, a loan application, a transaction request, and the like. Generally, the request may be of the nature that third party server 106 takes additional steps to authenticate the identity of the individual making the request.

At step 204, third party server 106 may receive the request from client device 102. At step 206, third party server 106 may prompt user to authenticate him or herself. For example, third party server 106 may prompt user to transmit a pregenerated token comprising a biometric reading.

At step 208, client device 102 may receive the prompt from third party server 106. For example, third party server 106 may generate a webpage to be displayed to user of client device 102 via application 110, instructing the user to transmit the pre-generated token for validation. At step 210, client device 102 may transmit a request to organization computing system 104. The request to organization computing system 104 may be a request for authentication via a biometric reading. In other words, client device 102 may submit a request to organization computing system 104 to access functionality of biometric agent 116.

At step 212, organization computing system 104 receive the request from client device 212. At step 214, upon receiving the request, organization computing system 104 may generate an application programming interface (API) that links client device 102 to functionality of organization computing system 104. For example, organization computing system 104 may generate an API that allows client device 102 to upload (or transmit) a token that includes a biometric reading, such that biometric agent 116 can verify the user.

At step 216, organization computing system 104 may notify client device 102 that API is available. For example, organization computing system 104 may transmit a notification to user via application 110 executing on client device 102. At step 218, client device 102 may receive notification from organization computing system 104 that the API is available.

At step 222, client device 102 may transmit the pre-generated token to organization computing system 104. For example, client device 102 may transmit token to organization computing system 104 via application 110.

At step 224, organization computing system 104 may receive the token from client device 102. At step 226, organization computing system 104 may identify a user associated with the request. For example, organization computing system 104 may query database 108 with a user identifier to determine if a user account exists that corresponds to the requesting user.

At step 228, organization computing system 104 may query database 108 to determine if a match exists between the received token and biometric information 122 stored therein. In some embodiments, organization computing system 104 may query database 108 with the token to determine whether there is a matching token in user account 124. In some embodiments, organization computing system 104 may query database 108 with an underlying biometric reading to determine if the biometric reading matches a biometric reading in biometric information 122.

At step 230, organization computing system 104 determines whether a match exists. If, at step 230, organization computing system 104 determines that a match exists, then at step 232, organization computing system 104 may generate a confirmation message to be transmitted to third party server 106. In some embodiments, the confirmation message may further include one or more items of personal identification information 120 associated with user account 124. For example, organization computing system 104 may include information that may be used by third party server 106 to aid in an application process.

If, however, at step 230, organization computing system 104 determines that a match does not exist, then at step 234, organization computing system 104 may generate a rejection message. The rejection message may signal to third party server 106 that there are issues validating the user's (e.g., requestor's) identity.

At step 236, organization computing system 104 may transmit the message to third party server 106. At step 238, organization computing system 104 may receive the message from organization computing system.

At step 240, third party server 106 may determine whether organization computing system 104 confirmed the identity of the requestor. For example, third party server 106 may parse the received message to identify whether organization computing system 104 confirmed or rejected the user's verification attempt. If, at step 240, third party server 106 determines that organization computing system 104 has confirmed the user's identity, then at step 242, third party server 106 accepts the user's request. If, however, at step 240, third party server 106 determines that organization computing system 104 has not confirmed the user's identity, then at step 244, third party server 106 rejects the user's request.

Figure 2B:
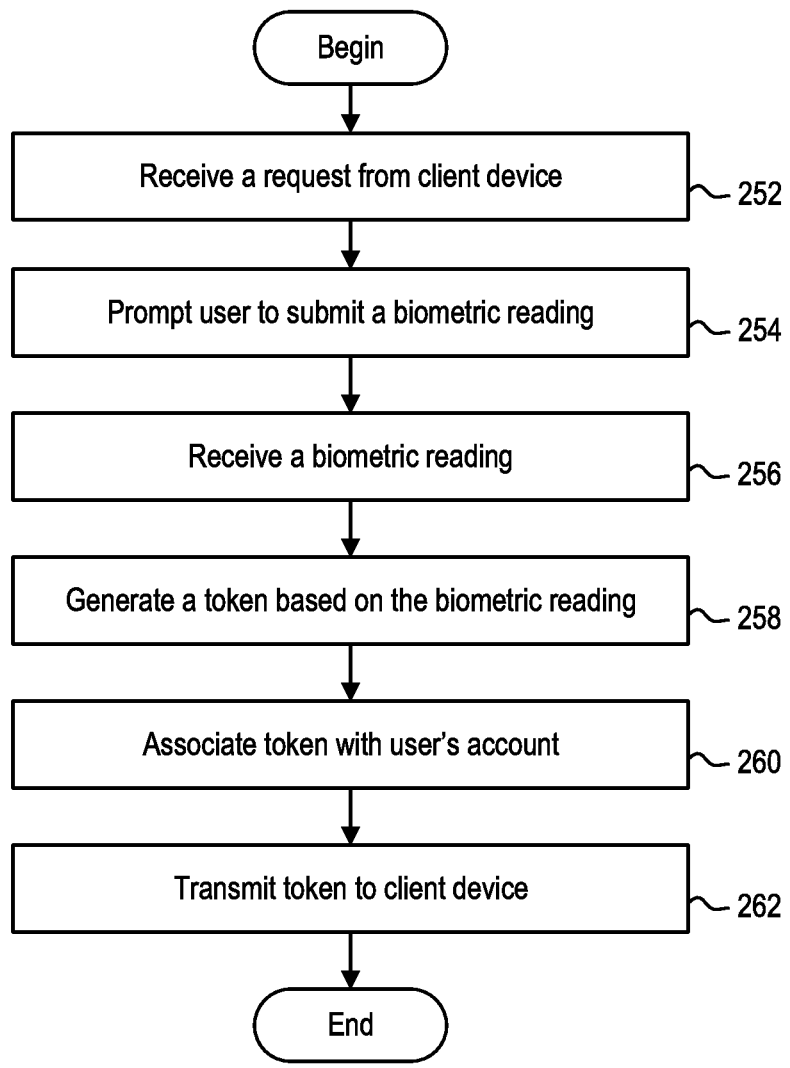
FIG. 2B is a flow diagram illustrating a method of generating a token, according to one exemplary embodiment.

FIG. 2B is a flow diagram illustrating a method 250 of generating a token, according to one embodiment. Method 250 may begin at step 252. At step 252, organization computing system 104 may receive a request from client device 102. The request from client device 102 may be to generate an authentication token to be used with various third party servers 106. In some embodiments, client device 102 may transmit the request via application 110 executing thereon.

At step 254, organization computing system 104 may prompt the user to submit a biometric reading. For example, organization computing system 104 may transmit a message to user via application 110, requesting that the user provide organization computing system 104 with a biometric reading via biometric scanner 112. The biometric reading may be, for example, one of a fingerprint, palm veins, facial recognition, hand geometry, iris recognition, retina recognition, voice recognition, and the like.

At step 256, organization computing system 104 may receive the biometric reading. In some embodiments, organization computing system 104 may receive the biometric reading from client device 102. For example, client device 102 may record a biometric reading using biometric scanner 112. In some embodiments, organization computing system 104 may receive the biometric reading from a third party service. For example, user of client device 102 may use the third party service to obtain a biometric reading. Rather than the user transmitting the biometric reading to organization computing system 104, the third party service may send the biometric reading instead.

At step 258, organization computing system 104 may generate a token corresponding to the biometric reading. In some embodiments, biometric agent 116 may generate the token such that the biometric reading is inaccessible to third party servers 106.

At step 260, organization computing system 104 may store the token in database 108. For example, organization computing system 104 may store token in database 108 and associated the token with the user's account 124.

At step 262, organization computing system 104 may transmit the token to client device 102. For example, organization computing system 104 may transmit the token to client device 102, such that user of client device 102 may use the token in subsequent transactions with third party servers 106, such as that discussed above in conjunction with FIG. 2B.

FIG. 3 is a block diagram illustrating communication among one or more components of the computing environment 300 of FIG. 1, according to one exemplary embodiment. As illustrated, computing environment 300 includes at least client device 102, third party server 106, and organization computing system 104.

At 302, third party server 106 may send a request to client device 102 for the user to authenticate his or her identity. At 304, client device 102 may transmit the pre-generated token to organization computing system 104 for further validation. At 306, upon verifying the token, organization computing system 104 may transmit a verification message to third party server 106. In some embodiments, organization computing system 104 may also transmit one or more items of personal identification information to third party server 106, such that the user is not burdened with providing at least some of that information. in some embodiments, at 308, third party server 106 may send a confirmation message to client device 102, notifying the user that organization computing system 104 has confirmed the user's identity.

Figure 4:
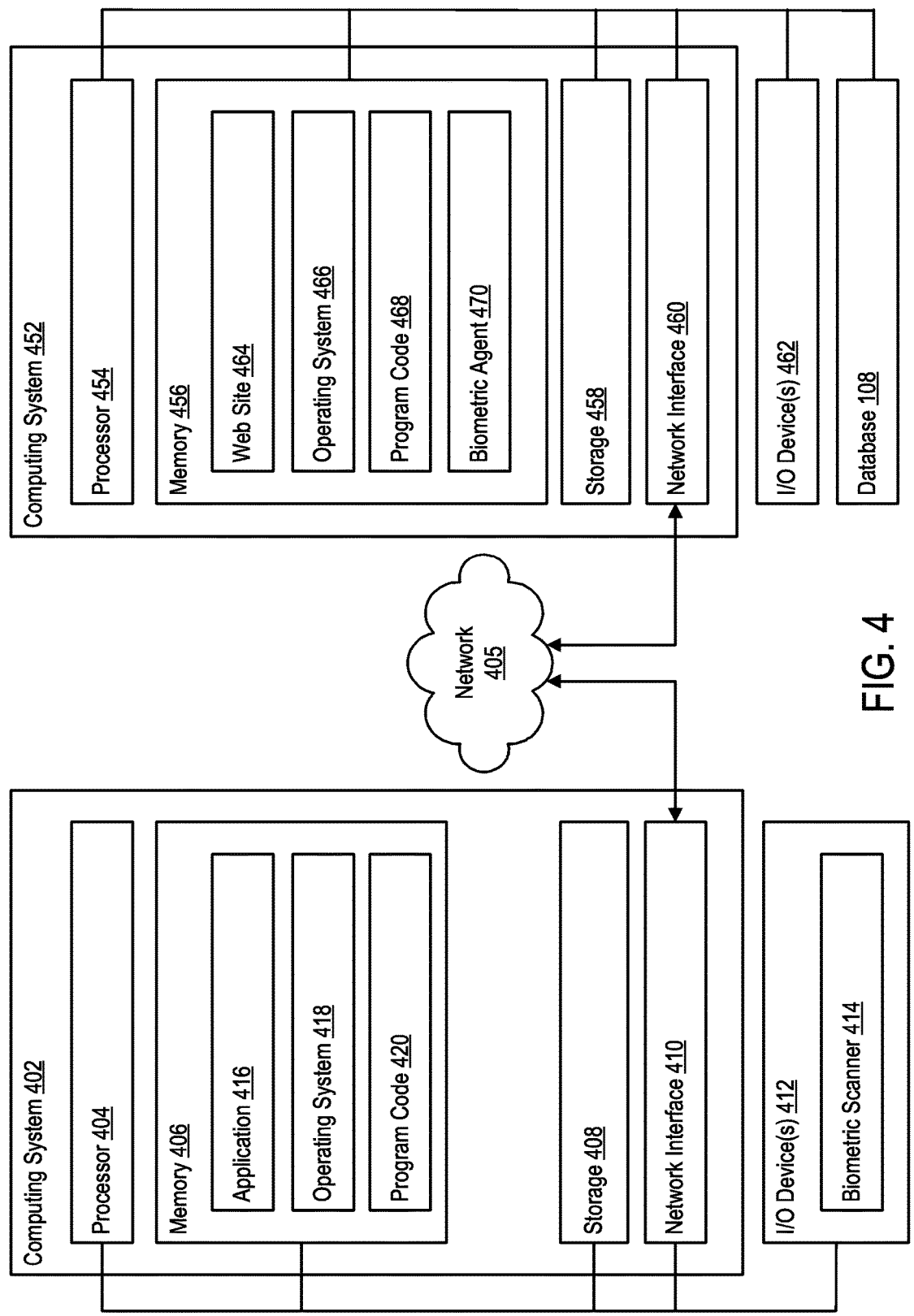
FIG. 4 is a block diagram illustrating a computing environment, according to one embodiment.

FIG. 4 is a block diagram illustrating an exemplary computing environment 400, according to some embodiments. Computing environment 400 includes computing system 402 and computing system 452. Computing system 402 may be representative of client device 102. Computing system 452 may be representative of organization computing system 104.

Computing system 402 may include a processor 404, a memory 406, a storage 408, and a network interface 410. In some embodiments, computing system 402 may be coupled to one or more I/O device(s) 412 (e.g., keyboard, mouse, etc.). I/O devices 412 may include biometric scanner 414. Biometric scanner 414 may be configured to capture one or more biometric readings of the user. For example, biometric scanner 414 may be configured to capture one or more of fingerprint, palm veins, facial recognition, hand geometry, iris recognition, retina recognition, voice recognition, and the like.

Processor 404 retrieves and executes program code 420 (i.e., programming instructions) stored in memory 406, as well as stores and retrieves application data. Processor 404 is included to be representative of a single processor, multiple processors, a single processor having multiple processing cores, and the like. Network interface 410 may be any type of network communications allowing computing system 402 to communicate externally via computing network 405. For example, network interface 410 is configured to enable external communication with computing system 452.

Storage 408 may be, for example, a disk storage device. Although shown as a single unit, storage 408 may be a combination of fixed and/or removable storage devices, such as fixed disk drives, removable memory cards, optical storage, network attached storage (NAS), storage area network (SAN), and the like.

Memory 406 may include application 416, operating system 418, and program code 420. Program code 420 may be accessed by processor 404 for processing (i.e., executing program instructions). Program code 420 may include, for example, executable instructions for communicating with computing system 452 to display one or more pages of website 464. Application 416 may enable a user of computing system 402 to access a functionality of computing system 452. For example, application 416 may access content managed by computing system 452, such as website 464 and biometric agent 470. The content that is displayed to a user of computing system 402 may be transmitted from computing system 452 to computing system 402, and subsequently processed by application 416 for display through a graphical user interface (GUI) of computing system 402.

Computing system 452 may include a processor 454, a memory 456, a storage 458, and a network interface 460. In some embodiments, computing system 452 may be coupled to one or more I/O device(s) 462. In some embodiments, computing system 452 may be in communication with database 108.

Processor 454 retrieves and executes program code 468 (i.e., programming instructions) stored in memory 456, as well as stores and retrieves application data. Processor 454 is included to be representative of a single processor, multiple processors, a single processor having multiple processing cores, and the like. Network interface 460 may be any type of network communications enabling computing system 452 to communicate externally via computing network 405. For example, network interface 460 allows computing system 452 to communicate with computer system 402.

Storage 458 may be, for example, a disk storage device. Although shown as a single unit, storage 458 may be a combination of fixed and/or removable storage devices, such as fixed disk drives, removable memory cards, optical storage, network attached storage (NAS), storage area network (SAN), and the like.

Memory 456 may include website 464, operating system 466, program code 468, and biometric agent 470. Program code 468 may be accessed by processor 454 for processing (i.e., executing program instructions). Program code 468 may include, for example, executable instructions configured to perform steps discussed above in conjunction with FIGS. 2A, 2B, and 3. As an example, processor 454 may access program code 468 to perform operations for verifying a pre-generated token received from client device 102, via a web browser/application (e.g., application 416). In another example, processor 454 may access program code 468 to perform operations for validating the token for future transactions. In another example, processor 454 may access program code 468 to generate the token using received biometric information from computing system 400. Website 464 may be accessed by computing system 402. For example, website 464 may include content accessed by computing system 402 via a web browser or application.

Biometric agent 470 may be configured to act as an intermediary between computing system 402 and one or more third party vendors (e.g., third party server 106). Biometric agent 470 may be configured to verify an identity of an individual through a biometric reading received from client device 102. Upon determining that there is a match, organization computing system 104 may transmit user-sensitive information to third party server 106 for the application process. In some embodiments, biometric agent 470 may further be configured to validate the pre-generated token. Accordingly, computing system 402 may subsequently use the validated token for future request/transactions.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of authenticating a user with a third party server, comprising:
   receiving, from a remote client device of a user, an authentication request for a current transaction with a third party server, the authentication request comprising a digitized file of a biometric information associated with the user;
   identifying that the user has a user account;
   comparing the digitized file to determine whether the biometric information in the digitized file matches a stored biometric information associated with the user account;
   upon determining that the biometric information matches the stored biometric information, generating an authenticated token to be transmitted to the third party server that authenticates the user; and
   prompting the remote client device to transmit the authenticated token to the third party server to authenticate the user for the current transaction and at least one future transaction with the third party server.

2. The method of claim 1, wherein the biometric information may be a fingerprint scan, an iris scan, a retinal scan, a voice recording, a facial scan, a hand geometry, or a vein scan.

3. The method of claim 1, further comprising:
   generating a verification message to be transmitted to the third party server that authenticates the user.

4. The method of claim 1, wherein the authentication request further comprises personal identification information associated with the user.

5. The method of claim 4, wherein the personal identification information comprises a username and a password.

6. The method of claim 1, wherein the biometric information is captured by a biometric scanner associated with the remote client device.

7. The method of claim 1, wherein the authenticated token may be used in subsequent authentication requests.

8. A method of authenticating a user with a third party server, comprising:

receiving, at a server of an organization computing system, a request from a remote client device of the user to authenticate the user with the third party server;

generating an application programming interface (API) configured to receive one or more parameters from the remote client device;

notifying the remote client device that the API is available;

receiving, from the remote client device of the user, an authentication request for a current transaction with a third party server, the authentication request comprising a digitized file of a biometric information associated with the user;

identifying that the user has a user account;

comparing the digitized file to determine whether the biometric information in the digitized file matches a stored biometric information associated with the user account;

upon determining that the biometric information matches the stored biometric information, generating an authenticated token to be transmitted to the third party server that authenticates the user; and prompting the remote client device to transmit the authenticated token to the third party server to authenticate the user for the current transaction and at least one future transaction with the third party server.

9. The method of claim 8, wherein the API links the remote client device to functionality of the server of the organization computing system.

10. The method of claim 8, wherein the biometric information may be a fingerprint scan, an iris scan, a retinal scan, a voice recording, a facial scan, a hand geometry, or a vein scan.

11. The method of claim 8, further comprising:
generating a verification message to be transmitted to the third party server that authenticates the user.

12. The method of claim 8, wherein the authentication request further comprises personal identification information associated with the user.

13. The method of claim 12, wherein the personal identification information comprises a username and a password.

14. The method of claim 8, wherein the biometric information is captured by a biometric scanner associated with the remote client device.

15. The method of claim 8, wherein the authenticated token may be used in subsequent authentication requests.

16. A system, comprising:
a processor; and
a memory having programming instructions stored thereon, which, when executed by the processor, performs operations, comprising:
receiving, from a remote client device of a user, an authentication request for a current transaction with a third party server, the authentication request comprising a digitized file of a biometric information associated with the user;
identifying that the user has a user account;
comparing the digitized file to determine whether the biometric information in the digitized file matches a stored biometric information associated with the user account;
upon determining that the biometric information matches the stored biometric information, generating an authenticated token to be transmitted to the third party server that authenticates the user; and
prompting the remote client device to transmit the authenticated token to the third party server to authenticate the user for the current transaction and at least one future transaction with the third party server.

17. The system of claim 16, wherein the biometric information may be a fingerprint scan, an iris scan, a retinal scan, a voice recording, a facial scan, a hand geometry, or a vein scan.

18. The system of claim 16, wherein the operations further comprise:
generating a verification message to be transmitted to the third party server that authenticates the user.

19. The system of claim 16, wherein the authentication request further comprises personal identification information associated with the user.

20. The system of claim 19, wherein the personal identification information comprises a username and a password.

* * * * *